(12) United States Patent
Tong et al.

(10) Patent No.: US 11,782,314 B2
(45) Date of Patent: Oct. 10, 2023

(54) BACKLIGHT MODULE, DISPLAY PANEL AND DISPLAY DEVICE

(71) Applicants: Beijing BOE Display Technology Co., Ltd., Beijing (CN); BOE TECHNOLOGY GROUP CO., LTD., Beijing (CN)

(72) Inventors: Guangyun Tong, Beijing (CN); Xu Chen, Beijing (CN); Xuefei Qin, Beijing (CN); Yu Zhang, Beijing (CN)

(73) Assignees: Beijing BOE Display Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 76 days.

(21) Appl. No.: 17/627,787

(22) PCT Filed: Mar. 9, 2021

(86) PCT No.: PCT/CN2021/079661
§ 371 (c)(1),
(2) Date: Jan. 17, 2022

(87) PCT Pub. No.: WO2021/196991
PCT Pub. Date: Oct. 7, 2021

(65) Prior Publication Data
US 2022/0326573 A1    Oct. 13, 2022

(30) Foreign Application Priority Data
Apr. 2, 2020 (CN) .......................... 202010255679.4

(51) Int. Cl.
*G02F 1/1335*    (2006.01)
*G02F 1/13357*    (2006.01)

(52) U.S. Cl.
CPC .. *G02F 1/133612* (2021.01); *G02F 1/133604* (2013.01)

(58) Field of Classification Search
CPC ......... G02F 1/133612; G02F 1/133604; H01R 11/18; H01R 12/59; H01R 12/62; H05B 45/44; H05B 45/30; H05B 45/10
See application file for complete search history.

(56) References Cited

U.S. PATENT DOCUMENTS

2008/0088769 A1    4/2008  Kim et al.
2011/0075443 A1    3/2011  Huang et al.
(Continued)

FOREIGN PATENT DOCUMENTS

CN    202419372 U    9/2012
CN    102734707 A    10/2012
(Continued)

OTHER PUBLICATIONS

China Patent Office, First Office Action dated Dec. 29, 2021 for application No. CN202010255679.4.

*Primary Examiner* — Anabel Ton
(74) *Attorney, Agent, or Firm* — HOUTTEMAN LAW LLC (57) ABSTRACT

The embodiments of the invention provide a backlight module, a display panel and a display device. The backlight module includes two sets of lamp bars arranged side by side, a first backlight driving module, a second backlight driving module, a plurality of first transfer circuit boards, a plurality of second transfer circuit boards, a plurality of first connection lines and a plurality of second connection lines. A plurality of first lamp bar units in the first set of lamp bars are coupled to the first transfer circuit board, and in turn coupled to the first backlight driving module through first connection lines. A plurality of second lamp bar units in the second set of lamp bars are coupled to the second transfer
(Continued)

circuit board, and coupled to the second backlight driving module through second connection lines. Each first connection line is the same as the corresponding second connection line.

20 Claims, 9 Drawing Sheets (56) References Cited

U.S. PATENT DOCUMENTS

| | | | |
|---|---|---|---|
| 2017/0051904 A1 | 2/2017 | Tsai et al. | |
| 2020/0303850 A1* | 9/2020 | Roh | ........................ H01R 12/62 |
| 2023/0056094 A1* | 2/2023 | Kim | ........................ H01L 24/32 |

FOREIGN PATENT DOCUMENTS

| | | | |
|---|---|---|---|
| CN | 103438408 A | 12/2013 |
| CN | 203535343 U | 4/2014 |
| CN | 108267817 A | 7/2018 |
| CN | 208314415 U | 1/2019 |
| CN | 208903044 U | 5/2019 |
| CN | 111308786 A | 6/2020 |
| JP | 2013229229 A | 11/2013 |

\* cited by examiner

BACKLIGHT MODULE, DISPLAY PANEL AND DISPLAY DEVICE

TECHNICAL FIELD

The invention belongs to the field of display technology, and particularly to a backlight module, a display panel and a display device.

BACKGROUND

With the development of display technology, liquid crystal display panels as mainstream display technologies are developing towards high resolution, super large size and the like, and the display panels with large size and high resolution have a huge number of assembly components, which results in numerous items in a bill of materials (BOM) of the display panels, and further results in difficulty in producing and assembling the display panels, and therefore how to reduce the assembly components required by the display panels becomes an urgent problem to be solved.

SUMMARY

In order to solve at least one of the technical problems existing in the prior art, the invention provides a backlight module, a display panel and a display device.

As a first aspect, an embodiment of the invention provides a backlight module, including: two sets of lamp bars arranged side by side, a first backlight driving module, a second backlight driving module, a plurality of first transfer circuit boards, a plurality of second transfer circuit boards, a plurality of first connection lines and a plurality of second connection lines.

A first set of lamp bars includes a plurality of first lamp bar units, and each of the first lamp bar units is coupled to one of the plurality of first transfer circuit boards. A second set of lamp bars includes a plurality of second lamp bar units, and each of the second lamp bar units is coupled to one of the plurality of second transfer circuit boards.

Each of the plurality of first transfer circuit boards is coupled to the first backlight driving module through at least one of the plurality of first connection lines.

Each of the plurality of second transfer circuit board is coupled to the second backlight driving module through at least one of the plurality of second connection lines.

The plurality of first connection lines are in one-to-one correspondence to the plurality of second connection lines, and each of the plurality of first connection lines is identical to a corresponding one of the plurality of second connection lines.

According to the backlight module in an embodiment of the present invention, the lamp bars are divided into two groups/sets. A plurality of first lamp bar units in the first set of lamp bars are coupled to the first transfer circuit board, and in turn coupled to the first backlight driving module through first connection lines. A plurality of second lamp bar units in the second set of lamp bars are coupled to the second transfer circuit board, and in turn coupled to the second backlight driving module through second connection lines. Since each first connection line is the same as the corresponding second connection line, the types of the connection lines (i.e., first and second connection lines) in the backlight module can be reduced, the number of items in the bill of materials of the backlight module can be further reduced, that is, the first and second connection lines may be made of same items in the bill of materials, and the difficulty in producing and assembling the backlight module can be reduced.

Optionally, the first backlight driving module and the second backlight driving module are symmetrically arranged with respect to a center line between the first set of lamp bars and the second set of lamp bars. The first backlight driving module is on a side of the first set of lamp bars away from the central line, and the second backlight driving module is on a side of the second set of lamp bars away from the central line.

The plurality of second connection lines are formed by flipping the plurality of first connection lines corresponding to the plurality of second connection lines with respect to the center line between the first set of lamp bars and the second set of lamp bars.

Optionally, at least one first connector is on a side of each of the plurality of first transfer circuit boards, a plurality of second connectors are on the first backlight driving module, with one terminal of each of the first connection lines being coupled to one of the at least one first connector and the other terminal of the first connection line being coupled to one of the plurality of second connectors.

At least one third connector is on a side of the second transfer circuit board, a plurality of fourth connectors are on the second backlight driving module, with one terminal of each of the plurality of second connection lines being coupled to one of the at least one third connector, and the other terminal of the second connection line being coupled to one of the plurality of fourth connector.

Each of the at least one first connector includes a plurality of first pins arranged symmetrically according to polarities of the plurality of first pins.

Each of the plurality of second connectors includes a plurality of second pins, and a polarity-based arrangement of the plurality of second pins is the same as that of the plurality of first pins.

Each of the at least one third connector includes a plurality of third pins, and a polarity-based arrangement of the plurality of third pins is the same as that of the plurality of first pins.

Each of the plurality of fourth connector includes a plurality of fourth pins, and a polarity-based arrangement of the plurality of fourth pins is the same as that of the plurality of first pins.

The plurality of first pins includes a first set of first pins, a second set of first pins and a third set of first pins. The second set of first pins is between the first set of first pins and the third set of first pins.

Each of first pins in the first set of first pins and the third set of first pins has a negative polarity, each of first pins in the second set of first pins has a positive polarity, a number of first pins in the first set of first pins is the same as a number of first pins in the third set of the first pins, and the second set of first pins includes at least one first pin.

The plurality of third pins includes a first set of third pins, a second set of third pins, and a third set of third pins, and the second set of third pins are between the first set of third pins and the third set of third pins.

Each of third pins in the first set of third pins and the third set of third pins has a negative polarity, each of third pins in the second set of third pins has a positive polarity, a number of third pins in the first set of third pins is the same as a number of third pins in the third set of third pins, and the second set of third pins includes at least one third pin.

Optionally, each of the first lamp bar units includes a plurality of first lamp bead sets, and each of the plurality of first lamp bead set includes at least one first lamp bead.

A sum of the number of the first pins in the first set of first pins and the number of the first pins in the third set of first pins is equal to a quotient obtained by dividing a number of the plurality of first lamp bead sets in the first lamp bar unit coupled to the corresponding first transfer circuit board by a number of the first connectors on the first transfer circuit board, Each of the second lamp bar units includes a plurality of second lamp bead sets, and each of the plurality of second lamp bead sets includes at least one second lamp bead.

A sum of the number of the third pins in the first set of third pins and the number of the third pins in the third set of third pins is equal to quotient obtained by dividing a number of the plurality of second lamp bead sets in the second lamp bar unit coupled to the corresponding second transfer circuit board by a number of the third connectors on the second transfer circuit board.

Optionally, a number of first pins in the second set of the first pins is greater than one half of a sum of the number of the first pins in the first set of the first pins and the number of the first pins in the third set of the first pins.

A number of the third pins in the second set of third pins is greater than one half of a sum of the number of the third pins in the first set of third pins and the number of the third pins in the third set of third pins.

Optionally, at least one floating pin is between the first set of first pins and the second set of first pins, and at least one floating pin is between the second set of first pins and the third set of first pins.

At least one floating pin is between the first set of third pins and the second set of third pins, and at least one floating pin is between the second set of third pins and the third set of third pins.

Optionally, each of the plurality of first transfer circuit boards is provided with two first connectors, and each of the plurality of first transfer circuit boards is coupled to two of the plurality of first connection lines.

Each of the plurality of second transfer circuit boards is provided with two third connectors, and each of the plurality of second transfer circuit boards is coupled to the two of the plurality of second connection lines.

Optionally, the first backlight driving module and the second backlight driving module are rotationally symmetrical at a rotation angle of 180°.

Optionally, the first backlight driving module includes a first side and a second side opposite to each other. The first backlight driving module has a plurality of second connectors thereon, the plurality of second connectors are divided into two sets respectively on the first side and the second side. An orientation of connection surfaces of the second connectors on the first side is opposite to an orientation of connection surfaces of the second connectors on the second side.

The second backlight driving module includes a third side and a fourth side opposite to each other, the second backlight driving module has a plurality of fourth connectors thereon, the fourth connectors are divided into two sets respectively on the third side and the fourth side. An orientation of connection surfaces of the fourth connectors on the third side is opposite to an orientation of connection surfaces of the fourth connectors on the fourth side.

Optionally, each of the plurality of first connection lines has a socket corresponding to the second connector at one terminal, and a connection surface of the socket of the first connection line faces a connection surface of the second connector.

Each of the plurality of second connection lines has a socket corresponding to the fourth connector at one terminal, and a connection surface of the socket of the second connection line faces a connection surface of the fourth connector.

Optionally, each of the plurality of first lamp bar units includes a plurality of first lamp bars, each of the plurality of first transfer circuit boards is further provided with a plurality of fifth connectors on a side of the first transfer circuit board away from the at least one first connector, and each of the plurality of fifth connectors is coupled to one of the plurality of first lamp bars.

Each of the plurality of second lamp bar units includes a plurality of second lamp bars, each of the plurality of second transfer circuit boards is further provided with a plurality of sixth connectors on a side of the second transfer circuit board away from the at least one fourth connector, and each of the plurality of sixth connectors is coupled to one of the plurality of second lamp bars.

Optionally, the first transfer circuit board further includes a plurality of third connection lines, the plurality of third connection lines being in one-to-one correspondence with the plurality of fifth connectors, and each of the plurality of third connection lines has one terminal coupled to the fifth connector and the other terminal coupled to the corresponding first lamp bar.

The second transfer circuit board further includes a plurality of fourth connection lines, the plurality of fourth connection lines being one-to-one correspondence with the plurality of sixth connectors, and each of the plurality of fourth connection lines has one terminal coupled to the sixth connector and the other terminal coupled to the corresponding second lamp bar.

The plurality of third connection lines are identical to the plurality of fourth connection lines.

As a second aspect, an embodiment of the invention provides a display panel including at least one above backlight module.

As a third aspect, an embodiment of the invention provides a display device including above display panel.

DETAIL DESCRIPTION OF EMBODIMENTS

In order to make the objects, technical solutions and advantages of the present invention more apparent, the present invention will be described in further detail with reference to the accompanying drawings. Obviously, the described embodiments are only some, not all the embodiments in the present invention. All other embodiments, which can be obtained by a person skilled in the art without making any creative effort based on the embodiments in the present invention, belong to the protection scope of the present invention.

The shapes and sizes of the components in the drawings are not to scale, but are merely intended to facilitate an understanding of the contents of the embodiments of the present invention.

Unless defined otherwise, technical or scientific terms used herein shall have the ordinary meaning as understood by one of ordinary skill in the art to which this disclosure belongs. The use of "first," "second," and the like in this disclosure is not intended to indicate any order, quantity, or importance, but rather is used to distinguish one element from another. Also, the use of the terms "a," "an," or "the" and similar referents do not denote a limitation of quantity of an element, but rather denote the presence of the element. The word "comprising" or "comprises", and the like, means that the element or item preceding the word comprises the element or item listed after the word and its equivalent, but does not exclude other elements or items. The terms "connected" or "coupled" and the like are not restricted to physical or mechanical connections, but may include electrical connections, whether direct or indirect. "Upper", "lower", "left", "right", and the like are used only to indicate relative positional relationships, and when the absolute positions of the described objects change, the relative positional relationships may also change accordingly.

Figure 1:
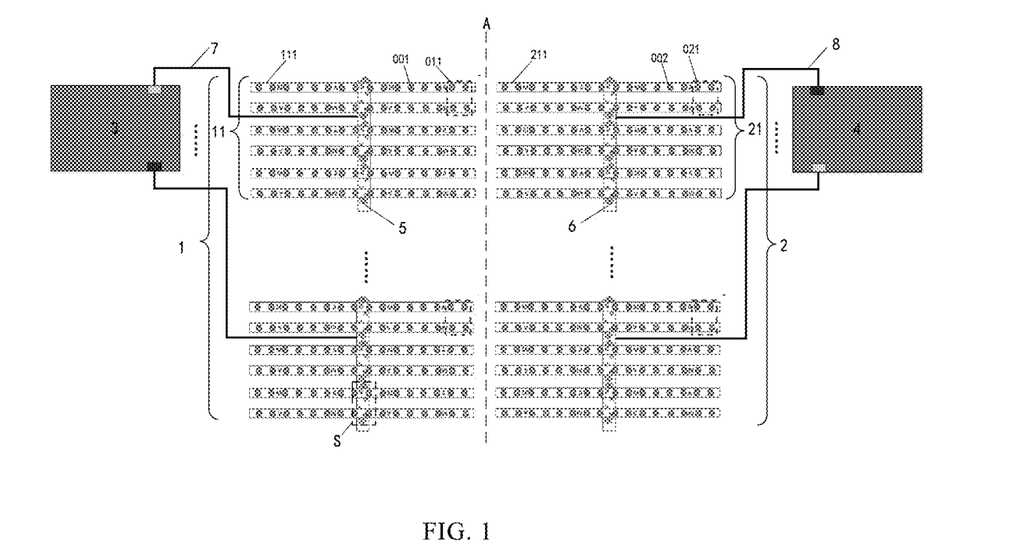
FIG. 1 is a schematic diagram showing a structure of a backlight module according to an embodiment of the invention.

As a first aspect, as shown in FIG. 1, an embodiment of the present invention provides a backlight module, including: two sets of lamp bars (i.e., a first set of lamp bars 1 and a second set of lamp bars 2) arranged side by side, a first backlight driving/convert board 3, a second backlight driving module 4, a plurality of first transfer circuit boards 5, a plurality of second transfer circuit boards 6, a plurality of first connection lines 7 and a plurality of second connection lines 8.

Specifically, as shown in FIG. 1, the backlight module includes a plurality of lamp bars, and the plurality of lamp bars are equally divided into the first set of lamp bars 1 and the second set of lamp bars 2 by a central line (or middle line) A in a distribution area of the plurality of lamp bars as a dividing line. The lamp bars in the first set of lamp bars 1 are referred to as first lamp bars 111, and the lamp bars in the second set of lamp bars 2 are referred to as second lamp bars 211. The central line A is a central line between the first set of lamp bars 1 and the second set of lamp bars 2. The first backlight driving module 3 and the second backlight driving module 4 are symmetrically arranged on a left side and a right side of the lamp bars with respect to the central line A between the first set of lamp bars 1 and the second set of lamp bars 2. The first backlight driving module 3 is on a side of the first set of lamp bars 1 away from the central line A, and the second backlight driving module 4 is on a side of the second set of lamp bars 2 away from the central line A. The first set of lamp bars 1 includes a plurality of first lamp bar units 11 arranged side by side in a column direction, each of the plurality of first lamp bar units 11 includes a plurality of first lamp bars 111 arranged side by side in the column direction. Each of the first lamp bar units 11 is coupled to one of the first transfer circuit boards 5, each of the first transfer circuit boards 5 is coupled to the first backlight driving module 3 on a side of the first set of lamp bars 1 through at least one first connection line 7. A driving signal is transmitted from the first backlight driving module 3 to the first transfer circuit board 5 through at least one first connection line 7, and then to the first lamp bars 111 of the first set of lamp bars 1 coupled to the first transfer circuit board 5. The second set of lamp bars 2 includes a plurality of second lamp bar units 21 arranged side by side in a column direction, each of the second lamp bar units 21 includes a plurality of second lamp bars 211 arranged side by side in the column direction. Each of the second lamp bar units 21 is coupled to one of the second transfer circuit boards 6, each of the second transfer circuit boards 6 is coupled to the second backlight driving module 4 on a side of the second set of lamp bars 2 through at least one second connection line 8. A driving signal is transmitted from the second backlight driving module 4 to the second transfer circuit board 6 through the second connection lines 8, and then to the second lamp bars 211 of the second set of lamp bars 2 coupled to the second transfer circuit board 6. The number and arrangement of the lamp bars in the first set of lamp bars 1 are the same as those of the second set of lamp bars 2; and the connection relationship and the position relationship between the first lamp bar units 11 and the first adaptor board 5 are the same as the connection relationship and the position relationship between the second lamp bar units 21 and the second adaptor board 6, and the connection relationship and the position relationship between the first connection line 7 and the first backlight driving module 3 are the same as the connection relationship and the position relationship between the second connection line 8 and the second backlight driving module 4. Therefore, the plurality of first connection lines 7 are in one-to-one correspondence to the plurality of second connection lines 8, each of the first connection lines 7 is the identical to/same as the corresponding second connection line 8, that is, the connection lines with the same shape and the same type may serve as the first connection lines 7 and the corresponding second connection lines 8 at the same time. In this way, the types of the connection lines in the backlight module can be reduced, and the number of items in a bill of materials (BOM) of the backlight module can be further reduced, that is, the plurality of first connection lines 7 and the plurality of second connection lines 8 may employ the same items in the bill of materials (BOM), thereby reducing the difficulty in producing and assembling the backlight module.

Figure 2:
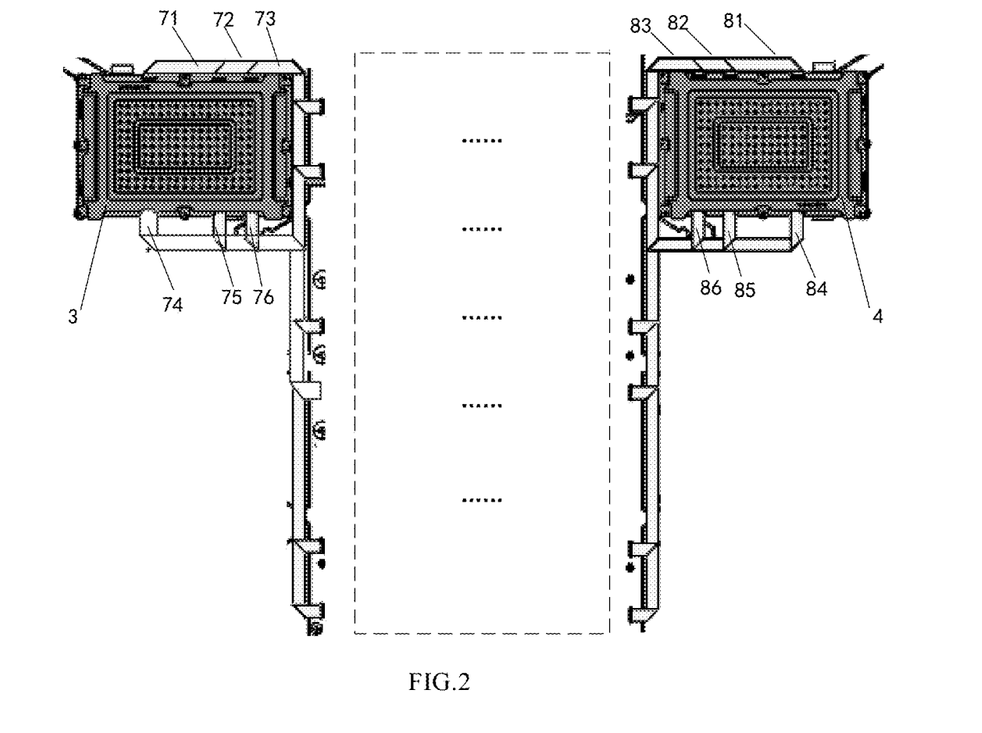
FIG. 2 is a schematic diagram showing structures of a backlight driving module and connection lines according to an embodiment of the present invention.
Figure 3A:
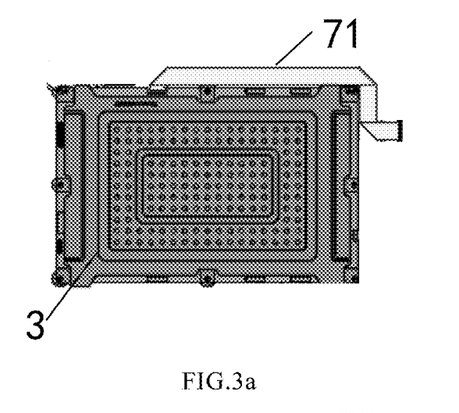
FIG. 3a to FIG. 3f are schematic diagrams showing structures of a first backlight driving module and first connection lines in FIG. 2.
Figure 3B:
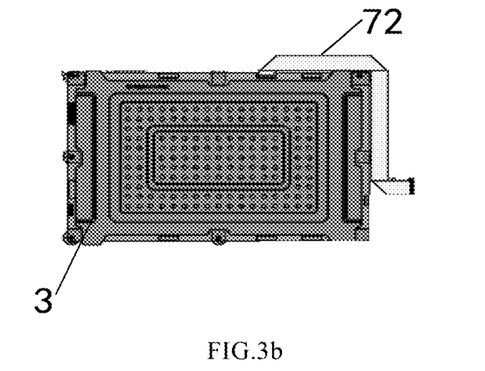
Figure 3C:
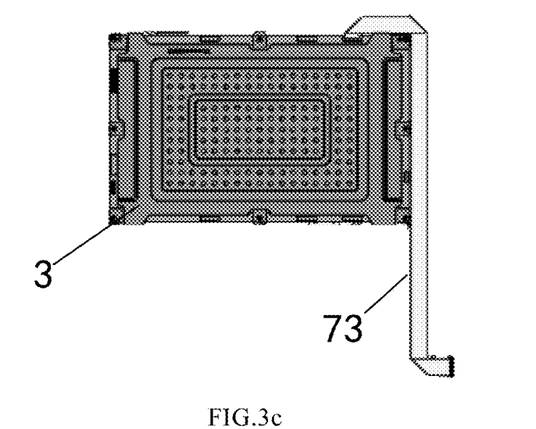
Figure 3D:
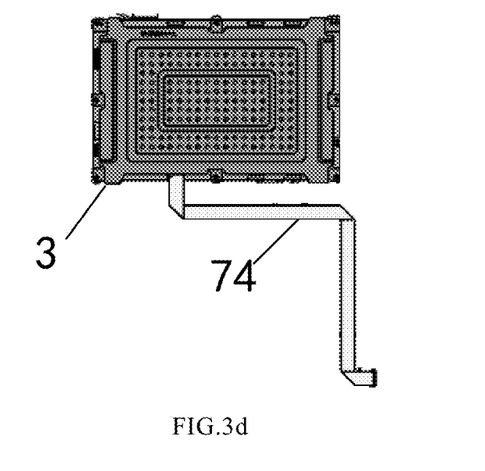
Figure 3E:
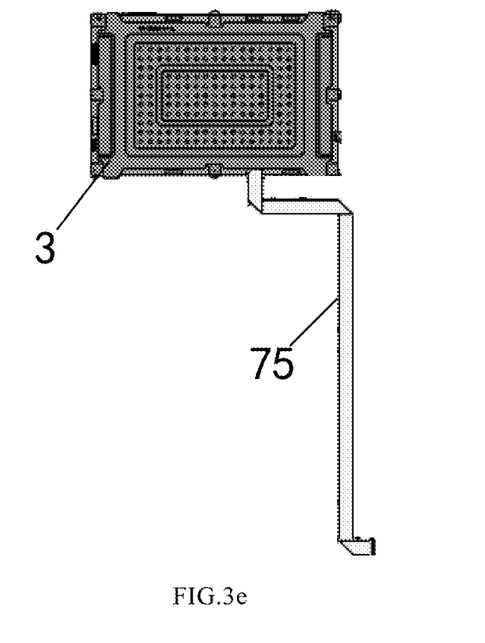
Figure 3F:
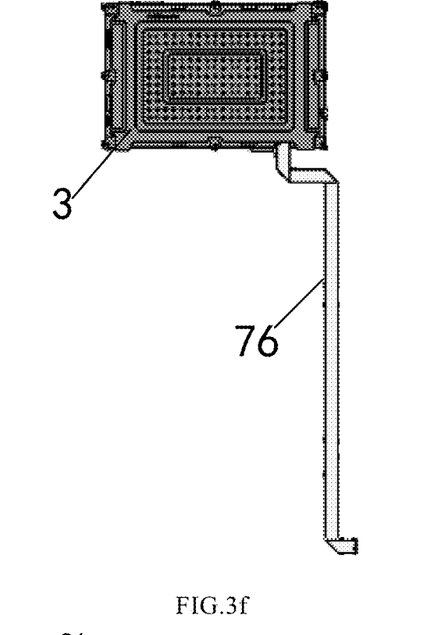
Figure 4A:
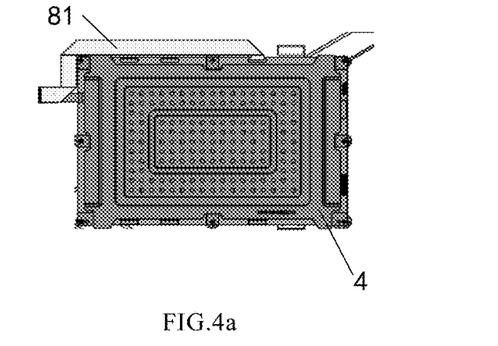
FIG. 4a to FIG. 4f are schematic diagrams showing structures of a second backlight driving module and second connection lines in FIG. 2.
Figure 4B:
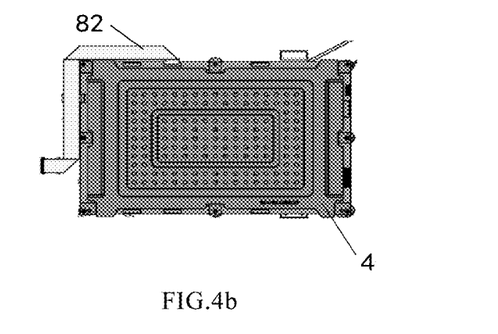
Figure 4C:
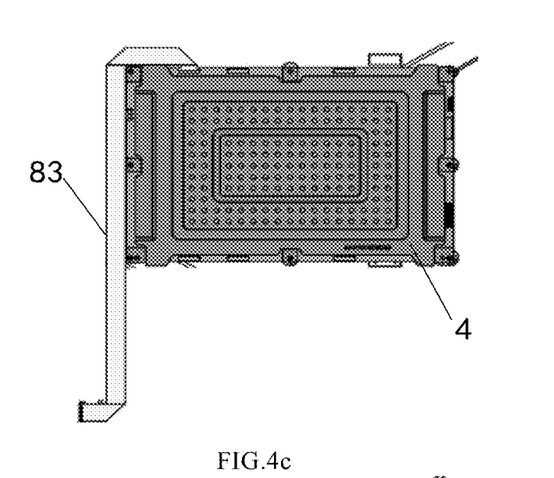
Figure 4D:
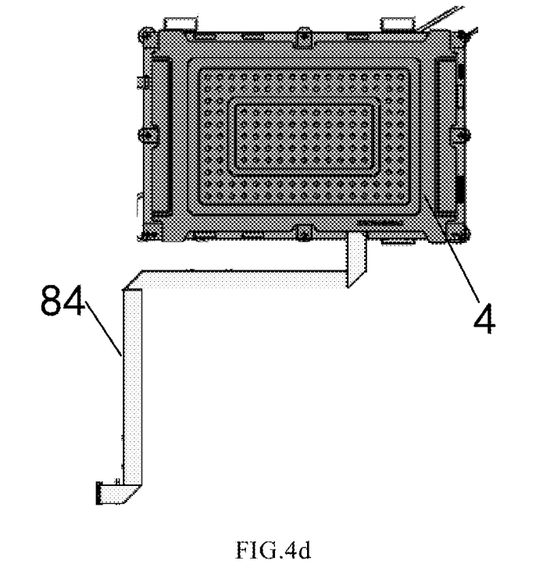
Figure 4E:
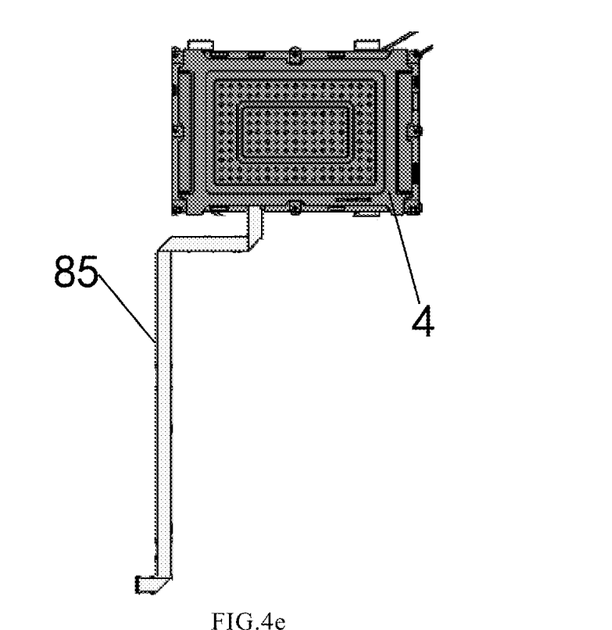
Figure 4F:
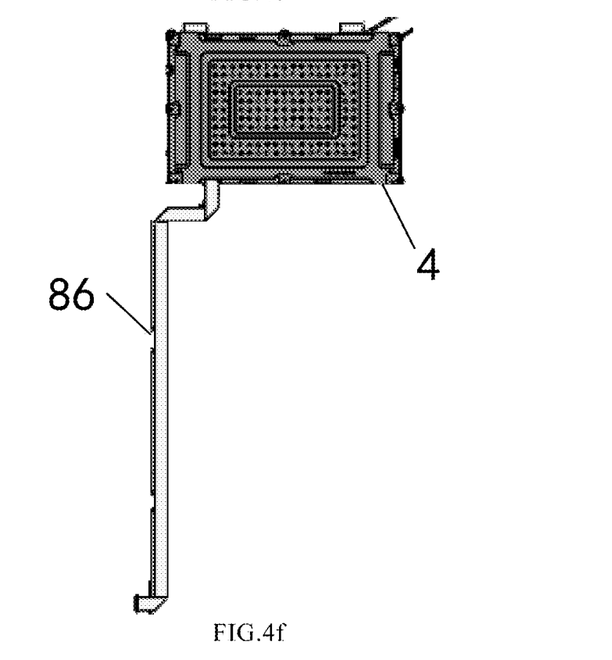

Optionally, as shown in FIG. 1 and FIG. 2, for convenience of description, for example, an example in which the first set of lamp bars 1 includes six first connection lines 71 to 76 (as shown in FIG. 2) respectively coupled to the first lamp bar units 11, and the second set of lamp bars 2 includes six second connection lines 81 to 86 (as shown in FIG. 2) respectively coupled to the second lamp bar units 21 as shown in FIG. 2 will be illustrated. A rectangular dotted line frame in FIG. 2 represents lamp bars that are not shown, which does not limit the present embodiment. Referring to FIG. 1, since the first backlight driving module 3 and the second backlight driving module 4 are symmetrically arranged with respect to a center line/middle line A between the first set of lamp bars 1 and the second set of lamp bars 2, a distance from the first backlight driving module 3 to the first set of lamp bars 1 is the same as a distance from the second backlight driving module 4 to the second set of lamp bars 2. Moreover, the number of the first lamp bar units 11 in the first set of lamp bars 1 is the same as the number of the second lamp bar units 21 in the second set of lamp bars 2. Each first lamp bar unit 11 is coupled to the first transfer circuit board 5, and each second lamp bar unit 21 is coupled to the second transfer circuit board 6. The arrangement layout of the first transfer circuit boards 5 is the same as the arrangement layout of the second transfer circuit boards 6, therefore a position relationship between the first backlight driving module 3, the first transfer circuit boards 5 and the first lamp bar units 11 is the same as a position relationship between the second backlight driving module 4, the second transfer circuit boards 6 and the second lamp bar units 21. As a result, after the first connection lines 7 of the first backlight driving module 3 are turned over (flipped) with respect to the central line A between the first set of lamp bars 1 and the second set of lamp bars 2, the corresponding second connection lines 8 coupled to the second backlight driving module 4 may be obtained. That is, the second connection line 8 is obtained by turning over the first connection line 7 corresponding to the second connection line 8 with respect to the central line A between the first set of lamp bars 1 and the second set of lamp bars 2.

Specifically, referring to FIG. 2, FIG. 3a to FIG. 3f, and FIG. 4a to FIG. 4f, wherein FIG. 3a to FIG. 3f are independent schematic diagrams showing six first connection lines 71 to 76 coupled to the first backlight driving module 3 on the left side in FIG. 2, respectively; and FIG. 4a to FIG. 4f are independent schematic diagrams showing six second connection lines 81 to 86 coupled to the second backlight driving module 4 on the right side in FIG. 2, respectively. The $1^{st}$ first connection line 71 in FIG. 3a corresponds to the $1^{st}$ second connection line 81 in FIG. 4a, and the structure, shape and model of the $1^{st}$ first connection line 71 are the same as those of the $1^{st}$ second connection line 71. The $1^{st}$ first connection line 71 is turned over with respect to the middle line A to obtain the $1^{st}$ second connection line 81. Similarly, the first connection line 72 in FIG. 3b corresponds to the second connection line 82 in FIG. 4b, the first connection line 73 in FIG. 3c corresponds to the second connection line 83 in FIG. 4c, and so on. The $6^{th}$ first connection line 76 in FIG. 3f corresponds to the $6^{th}$ second connection line 86 in FIG. 4f. The first backlight driving module 3 and the second backlight driving module 4 are symmetrically arranged with respect to the central line A, which ensures that the positional relationship between the first transfer circuit boards 5 coupled to the first lamp bar units 11 and the first backlight driving module 3 is the same as the positional relationship between the second connection plates 6 coupled to the second lamp bar units 21 and the second backlight driving module 4, therefore the same connection lines may be served as both of the first connection lines 7 for the first transfer circuit board 5 and the second connection lines 8 for the corresponding second transfer circuit board 6. That is, the first connection lines (e.g., the first connection lines 71 to 76 in FIG. 2) coupled to the first backlight driving module 3 on the left and the second connection lines (e.g., the second connection lines 81 to 86 in FIG. 2) coupled to the second backlight driving module 4 on the right may employ the same connection lines, or the same BOM, therefore the number of items in the bill of materials of the backlight module can be further reduced, and the difficulty in producing and assembling the backlight module can be reduced. Since the first connection lines have different lengths and the second connection lines have different lengths, only the connection line with the corresponding length can be installed at the corresponding position, so that the assembly defect can be avoided.

Optionally, the first connection line 7 and the second connection line 8 may be various types of connection lines, such as a Flexible Flat Cable (FFC). The types of connection lines are not limited herein, and other types of connection lines may also be used.

Figure 5:
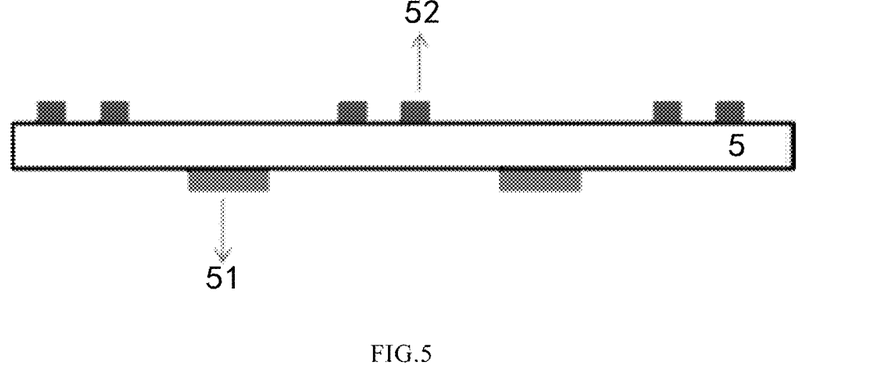
FIG. 5 is a side view showing a first transfer circuit board according to an embodiment of the present invention.
Figure 6:
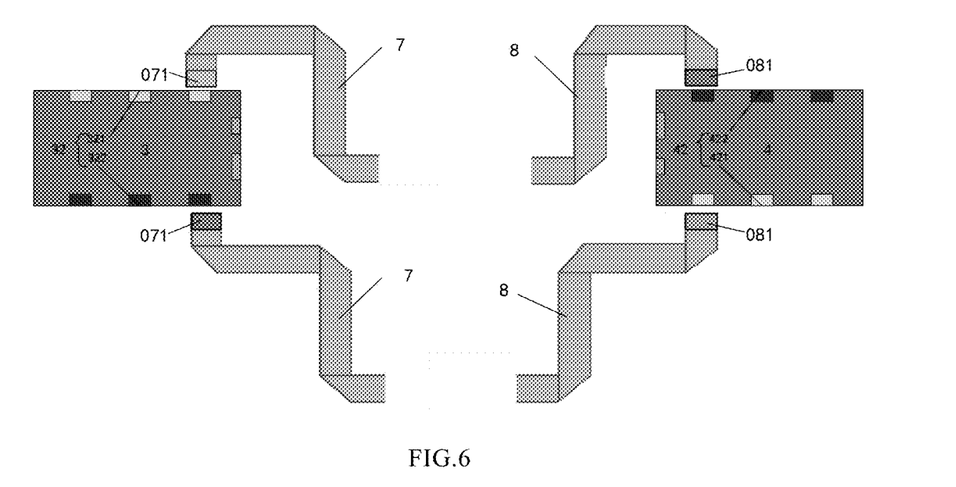
FIG. 6 is a schematic diagram showing a connector of a backlight driving module and a socket of a connection line according to an embodiment of the present invention.

Optionally, as shown in FIG. 5 to FIG. 6, at least one first connector (CNT) 51 is disposed on a surface of the first transfer circuit board 5, and a plurality of second connectors 32 are disposed on the first backlight driving module 3. One terminal of the first connection line 7 is coupled to the first connector 51 on the first transfer circuit board 4, and the other terminal of the first connection line 7 is coupled to the second connector 32 on the first backlight driving module 3, thereby coupling the first transfer circuit board 5 to the first backlight driving module 3. Correspondingly, at least one third connector is disposed on a surface of the second adaptor board 6, and a plurality of fourth connectors 42 is disposed on the second backlight driving module 4. One terminal of the second connection line 8 is coupled to the third connector on the second adaptor board 32, and the other terminal of the second connection line is coupled to the fourth connector 42 on the second backlight driving module 4, thereby coupling the second adaptor board 6 to the second backlight driving module 4. The third connector and the second transfer circuit board 6 have the same structure as those of the first connector 51 and the first transfer circuit board 5 in FIG. 5, respectively.

Optionally, the number of the first connectors 51 on each of the first transfer circuit boards 5 may be set according to the number of the first lamp bars 111 to be controlled. For example, two first connectors 51 are disposed on each first transfer circuit board 5, and accordingly each first transfer circuit board 5 is coupled to two first connection lines 7, so that the signals of the first lamp bars to be controlled in the first lamp bar unit 11 coupled to the first transfer circuit board 5 are divided into two groups and transmitted via the first connection lines coupled to the two first connectors 51. Similarly, the number of the first connectors on each second transfer circuit board 6 may also be set according to the number of the second lamp bars 211 to be controlled. For example, each second transfer circuit board 6 is provided with two third connectors thereon, and each second transfer circuit board 6 is coupled to two second connection lines 8, so that the signals of the second lamp bars to be controlled in the second lamp bar unit 21 coupled to the second transfer circuit board 6 are divided into two groups and transmitted via the second connection lines 8 coupled to the two second connectors.

Optionally, as shown in FIG. 6, the first connection line 7 has a socket 071 corresponding to the second connector 32 at one terminal. A connection surface (i.e., a surface capable of conducting an electrical signal) of the socket 071 of the first connection line 7 is opposite to/faces a connection surface (i.e., a surface capable of conducting an electrical signal) of the second connector 32, so that the first connection line may be coupled to the second connector 32 for signal transmission. Similarly, the second connection line 8 has a socket 081 corresponding to the fourth connector 42 at one terminal. A connection surface of the socket 081 of the second connection line 8 is opposite to a connection surface of the fourth connector 42. Since the second connection line 8 is obtained by turning over the corresponding first connection line 7 with respect to the central line A, the connection surface of the socket 071 of the first connection line 7 is also turned over after the first connection line 7 is turned over. That is, if the connection surface of the socket 071 of the first connection line 7 faces upward, the connection surface of the socket 081 of the corresponding second connection line 8 faces downward, therefore the second connector 32 on the first backlight driving module 3 and the fourth connector 42 on the second backlight driving module 4 may be arranged correspondingly.

Figure 7:
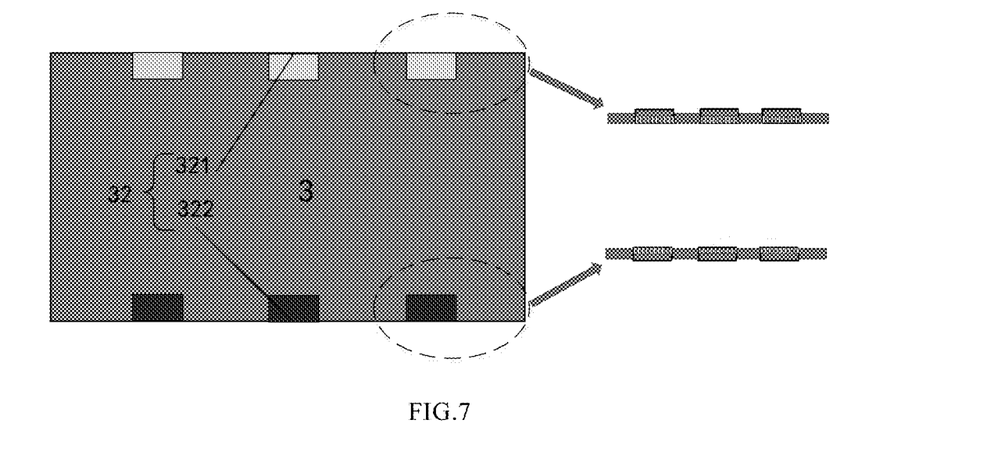
FIG. 7 is a schematic diagram showing a structure of a second connector of a first backlight driving module according to an embodiment of the present invention.

Specifically, as shown in FIG. 6 and FIG. 7, the first backlight driving module 3 includes a first side and a second side opposite to each other. The first backlight driving module 3 has a plurality of second connectors 32 thereon, the second connectors 32 are divided into two rows respectively on the first side and the second side. An orientation of connection surfaces of the second connectors 321 on the first side (e.g., a downward direction in FIG. 7) is opposite to an orientation of connection surfaces of the second connectors 322 on the second side (e.g., an upward direction in FIG. 7). Accordingly, the second backlight driving module 4 includes a third side and a fourth side opposite to each other. The third side of the second backlight driving module 4 corresponds to the first side of the first backlight driving module 3, and the fourth side of the second backlight driving module 4 corresponds to the second side of the first backlight driving module 3. The second backlight driving module 4 has a plurality of fourth connectors 42 thereon. The fourth connectors 42 are divided into two rows respectively on the third side and the fourth side. An orientation of connection surfaces of the fourth connectors 421 located on the third side is opposite to an orientation of connection surfaces of the fourth connectors 422 located on the fourth side. The first backlight driving module 3 and the second backlight driving module 4 are rotationally symmetric with a rotation angle of 180 degree. The second backlight driving module 4 is obtained by rotating the first backlight driving module 3 by 180 degree. That is, an orientation of the connection surfaces of the second connectors 321 on the first side of the first backlight driving module 3 is the same as an orientation of the connection surfaces of the fourth connectors 421 on the fourth side of the second backlight driving module 4, and an orientation of the connection surfaces of the second connectors 322 on the second side of the first backlight driving module 3 is the same as an orientation of the connection surfaces of the fourth connectors 422 on the third side of the second backlight driving module 4. With the above design, the first connection lines 7 coupled to the first backlight driving module 3 on the first side are turned over with respect to the center line A to serve as the corresponding second connection lines 8, so that the connection surfaces of the sockets 081 of the second connection lines 8 face the connection surfaces of the fourth connectors 422 on the third side of the second backlight driving module 4 respectively. The first connection lines 7 coupled to the first backlight driving module 3 on the second side are turned over with respect to the central line A to serve as the corresponding second connection lines 8, so that the connection surfaces of the sockets 081 of the second connection lines 8 face the connection surfaces of the fourth connectors 421 on the fourth side of the second backlight driving module 4 respectively, thereby ensuring that the connection lines having the same shape may be applied to both of the first backlight driving module 3 and the second backlight driving module 4 on the left and right sides, so that the backlight module only needs a backlight driving module of only one type, thereby further reducing the number of items in the bill of materials of the backlight module.

Optionally, the first connector on the first transfer circuit board 5, the second connector on the first backlight driving module 3, the third connector on the second transfer circuit board 6 and the fourth connector on the second backlight driving module 4 may be a connector of the same type. The first connector has a plurality of first pins, the second connector has a plurality of second pins, the third connector has a plurality of third pins, and the fourth connector has a plurality of fourth pins. The polarity-based arrangement of the first pins is centrosymmetric, that is, after the first pins are rotated by 180 degrees, the polarity order of the plurality of first pins does not change; accordingly, the arrangement of the polarities of the plurality of second pins is the same as that of the plurality of first pins, the arrangement of the polarities of the plurality of third pins is the same as that of the plurality of first pins, and the arrangement of the polarities of the plurality of fourth pins is the same as that of the plurality of first pins, therefore after the first backlight driving module 3 is rotated by 180 degree to serve as the second backlight driving module 4, the arrangement of the polarities of the fourth pins on the fourth connector of the second backlight driving module 4 is the same as that of the second pins on the second connector of the first backlight driving module 3, thereby preventing an incorrect driving signal from transmitting into the corresponding lamp bars due to the change of the polarity.

Figure 8:
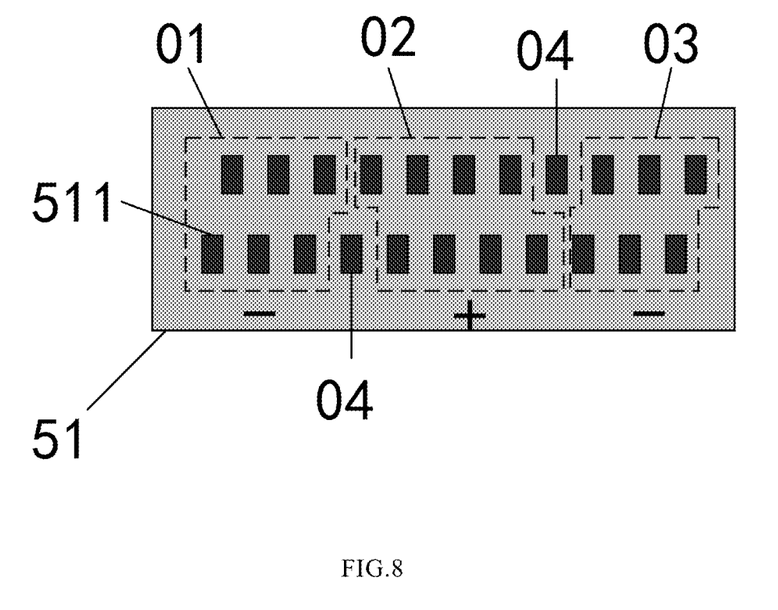
FIG. 8 is a schematic diagram showing a polarity-based arrangement of a plurality of first pins according to an embodiment of the present invention.

Further, referring to FIG. 8, one first connector 51 is taken as an example for illustration. The first connector 51 has a plurality of first pins 511, the plurality of first pins are divided into a first set of first pins 01, a second set of first pins 02 and a third set of first pins 03. The second set of first pins 02 is disposed between the first set of first pins 01 and the third set of first pins 03. Both of the first pins 511 in the first set of first pins 01 and the first pins in the third set of first pins 03 have a negative (−) polarity, and all the first pins 511 in the second set of first pins 02 have a positive (+) polarity. The number (i.e., six in FIG. 8) of the first pins in the first set of first pins 01 is the same as the number (i.e., six in FIG. 8) of the first pins in the third set of first pins 03, and the second set of first pins 02 includes at least one first pin 511. The first connection line 7 is correspondingly coupled between the first connector 51 and the second connector, therefore the polarity-based arrangement of the second pins in the second connector is also the same as the polarity-based arrangement of the first pins in the first connector 51, so as to maintain the consistency of the signals through the first connection lines 7. Correspondingly, the plurality of third pins may have the same polarity-based arrangement as that of the first pins. That is, the plurality of third pins may be divided into a first set of third pins, a second set of third pins, and a third set of third pins. The second set of third pins is located between the first set of third pins and the third set of third pins. Both of the third pins in the first set of third pins and the third pins in the third set of third pins have a negative polarity, and all the third pins in the second set of third pins have a positive polarity. The number of the third pins in the first set of third pins is the same as the number of the third pins in the third set of third pins, and the second set of third pins includes at least one third pin. The second connection line 8 is correspondingly coupled between the third connector and the fourth connector, therefore the polarity-based arrangement of the fourth pins in the fourth connector is also the same as the polarity-based arrangement of the third pins in the third connector, so as to maintain the consistency of the signals through the second connection lines 8.

It should be noted that, many schemes can be applied to the arrangement of the first pins, the second pins, the third pins or the fourth pins. For example, as shown in FIG. 8, the plurality of first pins 511 are arranged in two rows, and the first pins 511 in the second row and the first pins 511 in the first row are staggered in the horizontal direction. Of course, the plurality of first pins 511 may also be arranged side by side as long as the arrangement of the first pins 511 (or the arrangement of the second pins, the third pins, or the fourth pins) is centrosymmetric, which is not limited herein.

Optionally, as shown in FIG. 1, the number of the pins with a negative polarity in the plurality of first pins, the plurality of second pins, the plurality of third pins or the plurality of fourth pins corresponds to the number of signals for controlling the first lamp bar unit 11 coupled to the corresponding first connection line 7 or corresponds to the number of signals for controlling the second lamp bar unit 21 coupled to the corresponding second connection line 8. Taking the first lamp bar unit 11 as an example, each first lamp bar unit 11 includes a plurality of first lamp bead sets 011, and each of the first lamp bead sets 011 includes at least one first lamp bead 001. For convenience of description herein, each first transfer circuit board 5 is coupled to one first lamp bar unit 11, each first lamp bar unit 11 includes six first lamp bars 111, each of the first lamp bars 111 includes sixteen first lamp beads 001, every four lamp beads 001 are coupled in series to form one of the first lamp bead sets 011, and each of the first lamp bead sets 011 corresponds to one signal. Therefore, one first lamp bar unit 11 includes twenty-four first lamp bead sets 011, and in turn corresponds to twenty-four signals. Since the first transfer circuit board 5 includes two first connectors 51 (e.g., as shown in FIG. 5), each first connector 51 needs to couple to twelve first lamp bead sets 011, and each first connector 51 needs to have twelve first pins with a negative polarity, each of the twelve first pins controls a corresponding one of the first lamp bead sets. Therefore, in combination with the above description, a sum of the number of the first pins in the first set of first pins 01 and the number of the first pins in the second set of first pins 02 is equal to a quotient obtained by dividing the number of the first lamp bead sets in the first lamp bead unit coupled to the corresponding first transfer circuit board 5 by the number of the first connectors 5 on the first transfer circuit board 5. The first connection line 7 is correspondingly coupled between the first connector 51 and the second connector, therefore the number of the second pins with a negative polarity of the second connector is the same as the number of the first pins with a negative polarity of the first connector 51, so as to maintain the consistency of the signals through the first connection lines 7. Similarly, each second lamp bar unit 21 includes a plurality of second lamp bead sets 021, each of the second lamp bead sets 021 includes at least one second lamp bead 002. A sum of the number of the third pins in the first set of third pins and the number of the third pins in the second set of third pins is equal to a quotient obtained by dividing the number of the second lamp bead sets 021 in the second lamp bar unit 21 coupled to the corresponding second transfer circuit board 6 by the number of the third connectors on the second transfer circuit board 6. The second connection line 8 is correspondingly coupled between the third connector and the fourth connector, therefore the number of the fourth pins with a negative polarity of the fourth connector is the same as the number of the third pins with a negative polarity of the third connector, so as to maintain the consistency of the signals through the second connection lines 8.

Optionally, a plurality of first pins with a negative polarity are coupled to first lamp bead sets 011 in a one-to-one correspondence manner for controlling the first lamp bead sets 011 respectively. An operation voltage is supplied to the plurality of first lamp bead sets 011 via the first pins with a positive polarity. The plurality of first lamp bead sets 011 may share one first pin with a positive polarity. However, in order to reach the required operation voltage, the more first lamp bead sets 011 coupled to one first pin are, the greater the current through the first pin is. In order to prevent first lamp bead sets 011 from being damaged by the overlarge current, the power supply is provided to the plurality of first lamp bead sets 011 via multiple first pins with a positive polarity. In a preferable embodiment, the number of the first pins in the second set of first pins 02 is greater than one half of the sum of the number of the first pins in the first set of first pins 01 and the number of the first pins in the third set of first pins 02. For example, referring to FIG. 8, the first set of first pins 01 has six first pins, the third set of first pins 02 has six first pins, and half of the sum of the number of the first pins in the first set of first pins 01 and the number of the first pins in the third set of first pins 02 is six, as a result, the number of the first pins in the second set of first pins 02 (i.e., the first pins with a positive polarity) is greater than six. In the embodiment, the number of the first pins in the second set of first pins 02 is eight. Similarly, the number of the third pins in the second set of third pins is also greater than one half of the sum of the number of the third pins in the first set of third pins and the number of the third pins in the third set of third pins, so as to prevent the second lamp bead sets 021 from being damaged by an overlarge current.

Optionally, referring to FIG. 8, at least one floating pin 04 is located between the first set of first pins 01 and the second set of first pins 02, and at least one floating pin 04 is located between the second set of first pins 02 and the third set of first pins 03. Correspondingly, at least one floating pin is located between the first set of third pins and the second set of third pins, and at least one floating pin is located between the second set of third pins and the third set of third pins. The floating pins 04 are not supplied with signals and configured to separate the pins with a positive polarity apart from the pins with a negative polarity, thereby preventing the signal interference between pins with a positive polarity and pins with a negative polarity, and ensuring the reliability of the pins for transmitting the signals.

Optionally, referring to FIG. 1 and FIG. 5, FIG. 5 is a partial schematic diagram showing the dashed region S in FIG. 1. Each first lamp bar unit 11 includes a plurality of first lamp bars 111, and the first transfer circuit board 5 is further provided with a plurality of fifth connectors 52 thereon. The fifth connectors 52 are disposed on a side of the first transfer circuit board 5 away from the first connectors 51, and each of the fifth connectors 52 is coupled to a corresponding one of the first lamp bars 111. For example, in FIG. 1, one first transfer circuit board 5 is coupled to a corresponding one of the first lamp bar units 11, and each of the first lamp bar units 11 includes six first lamp bars 111, so that each of the first transfer circuit boards 5 includes six fifth connectors 52. Similarly, each second lamp bar unit 21 includes a plurality of second lamp bars 211, and the second transfer circuit board 6 is further provided with a plurality of sixth connectors thereon. The sixth connectors are disposed on a side of the second transfer circuit board 6 opposite to the fourth connectors (i.e., the same arrangement as shown in FIG. 5), and each sixth connector is coupled to a corresponding one of second lamp bars 211.

Figure 9:
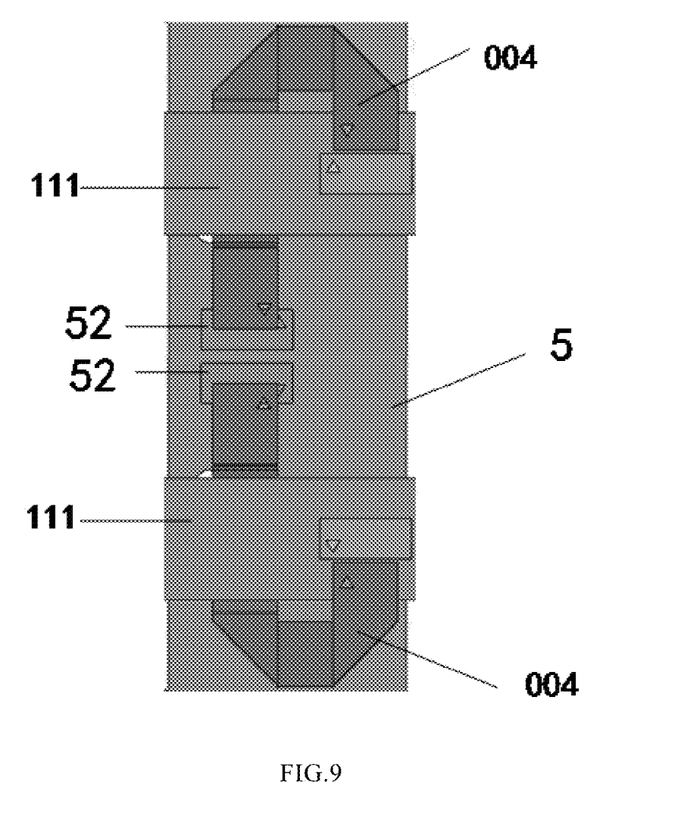
FIG. 9 is a schematic diagram showing structures of a fifth connector and a third connection line of the first transfer circuit board according to an embodiment of the present invention.

Further, referring to FIG. 1, FIG. 5, and FIG. 9, the first transfer circuit board 5 further includes a plurality of third connection lines 004, the third connection lines 004 are in one-to-one correspondence with the fifth connectors 52. One terminal of each of the third connection lines 004 is coupled to one of the fifth connectors 5, and the other terminal of the third connection line 004 is coupled to the corresponding first lamp bar 111. Correspondingly, the second transfer circuit board 6 further includes a plurality of fourth connection lines, the fourth connection lines are in one-to-one correspondence with the sixth connectors. One terminal of each of the fourth connection lines is coupled to one of the sixth connectors, and the other terminal of the fourth connection line is coupled to the corresponding second lamp bar (i.e., the same connection as shown in FIG. 9). The third connection lines 52 are the identical to the fourth connection lines, so that the number of items in the BOM of the backlight module can be further reduced.

Further, referring to FIG. 9, two fifth connectors 52 on the first transfer circuit board 5 form a fifth connector set, and a plurality of fifth connector sets are disposed on the first transfer circuit board 5. As shown in FIG. 9, two third connection lines 004 corresponding to the two fifth connectors 52 in each of the fifth connector sets are symmetrical up and down (i.e., with respect to a line along the horizontal direction). That is, the third connection line 004 on the upper side is turned over downward to serve as the third connection line on the lower side, thereby further reducing the number of items in the BOM of the backlight module. The second transfer circuit board 6 is identical in structure to the first transfer circuit board 5.

Figure 10:
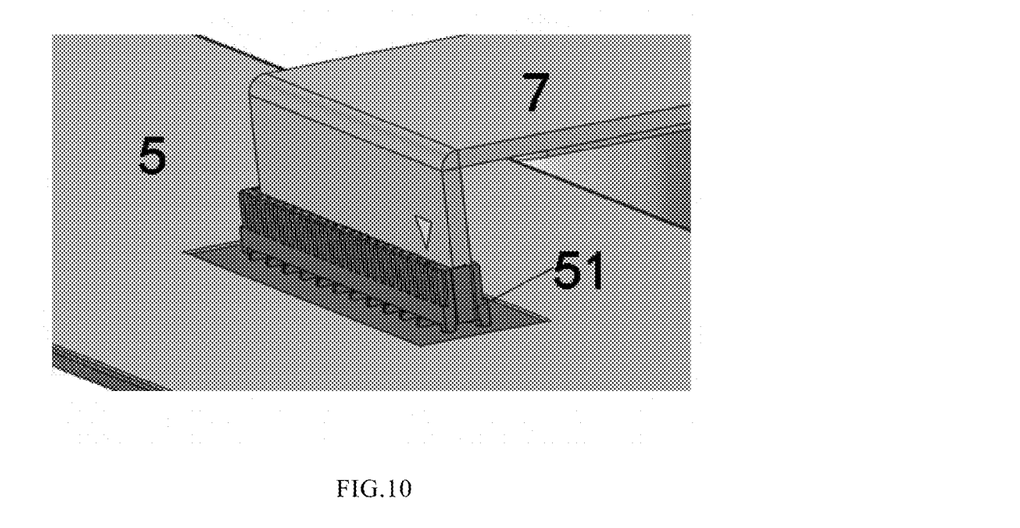
FIG. 10 is a schematic diagram showing a structure of a first connector according to an embodiment of the present invention.

Optionally, referring to FIG. 9 and FIG. 10, in the backlight module according to in the embodiment, the fifth connector 52 on a surface of the first transfer circuit board 5 coupled to the third connection line 004 may be a horizontal connector. That is, the fifth connector 52 is flat on the first transfer circuit board 5, and a socket of the third connection line 004 is also flat on the first transfer circuit board 5 and coupled to the fifth connector 52. The horizontal connector has a small height, so as to prevent the fifth connector 52 from blocking light emitted from the first lamp bar 111 after the fifth connector 52 is coupled to the third connection line 004. The plurality of first connectors 51 are disposed on a surface of the first transfer circuit board 5 coupled to the first connection lines 7, referring to FIG. 10. The first connector 51 may be a vertical connector, that is, the first connection line 7 is coupled to the first connector 51 in a standing state without being contact with the plane where the first transfer circuit board 5 is located. The use of the vertical connector can facilitate maintenance.

As a second aspect, an embodiment of the invention further provides a display panel, which includes at least one backlight module described above. If the display panel needs more lamp bars, a plurality of backlight modules may be further provided, that is, the display panel may include a plurality of first backlight driving modules 3 and a plurality of second backlight driving modules 4 in the backlight module. The detailed configuration may be designed as needed, which is not limited herein.

Optionally, the display panel in the embodiment of the present invention is a liquid crystal display panel, and the backlight module of the display panel is a direct type backlight module.

As a third aspect, an embodiment of the present invention further provides a display device including the display panel described above. Specifically, the display device in the embodiment of the present invention may be any product or component with a display function, such as a mobile phone, a tablet computer, a television, a display, a notebook computer, a digital photo frame, a navigator and the like. Other essential components of the display device are well known by a person skilled in the art, and are not described herein or should not be construed as limiting the invention.

It should be understood that the above implementations are merely exemplary embodiments for the purpose of illustrating the principles of the present disclosure, however, the present disclosure is not limited thereto. It will be apparent to a person skilled in the art that various changes and modifications can be made without departing from the spirit and essence of the present disclosure, which are also to be regarded as falling in the scope of the present disclosure.

What is claimed is:

1. A backlight module, comprising: two sets of lamp bars arranged side by side, a first backlight driving module, a second backlight driving module, a plurality of first transfer circuit boards, a plurality of second transfer circuit boards, a plurality of first connection lines and a plurality of second connection lines, wherein
   a first set of the two sets of lamp bars comprises a plurality of first lamp bar units, and each of the first lamp bar units is coupled to one of the plurality of first transfer circuit boards; a second set of the two sets of lamp bars comprises a plurality of second lamp bar units, and each of the second lamp bar units is coupled to one of the plurality of second transfer circuit boards,
   each of the plurality of first transfer circuit boards is coupled to the first backlight driving module through at least one of the plurality of first connection lines,
   each of the plurality of second transfer circuit board is coupled to the second backlight driving module through at least one of the plurality of second connection lines, and
   the plurality of first connection lines are in one-to-one correspondence to the plurality of second connection lines, and each of the plurality of first connection lines is identical to a corresponding one of the plurality of second connection lines.

2. The backlight module of claim 1, wherein
   the first backlight driving module and the second backlight driving module are symmetrically arranged with respect to a central line between the first set of lamp bars and the second set of lamp bars; the first backlight driving module is on a side of the first set of lamp bars away from the central line, and the second backlight driving module is on a side of the second set of lamp bars away from the central line, and
   the plurality of second connection lines are obtained by flipping the plurality of first connection lines corresponding to the plurality of second connection lines with respect to the central line between the first set of lamp bars and the second set of lamp bars.

3. The backlight module of claim 2, wherein
   at least one first connector is on a side of each of the plurality of first transfer circuit boards, a plurality of second connectors are on the first backlight driving module, with one terminal of each of the first connection lines being coupled to one of the at least one first connector and the other terminal of the first connection line being coupled to one of the plurality of second connectors, at least one third connector is on a side of the second transfer circuit board, a plurality of fourth connectors are on the second backlight driving module, with one terminal of each of the plurality of second connection lines being coupled to one of the at least one third connector, and the other terminal of the second connection line being coupled to one of the plurality of fourth connector, each of the at least one first connector comprises a plurality of first pins arranged symmetrically according to polarities of the plurality of first pins, each of the plurality of second connectors comprises a plurality of second pins, and a polarity-based arrangement of the plurality of second pins is the same as a polarity-based arrangement of the plurality of first pins, each of the at least one third connector comprises a plurality of third pins, and a polarity-based arrangement of the plurality of third pins is the same as a polarity-based arrangement of the plurality of first pins, and each of the plurality of fourth connector comprises a plurality of fourth pins, and a polarity-based arrangement of the plurality of fourth pins is the same as a polarity-based arrangement of the plurality of first pins.

4. The backlight module of claim 3, wherein the plurality of first pins comprise a first set of first pins, a second set of first pins and a third set of first pins, the second set of first pins is between the first set of first pins and the third set of first pins, each of first pins in the first set of first pins and the third set of first pins has a negative polarity, each of first pins in the second set of first pins has a positive polarity, a number of first pins in the first set of first pins is the same as a number of first pins in the third set of the first pins, and the second set of first pins comprises at least one first pin, the plurality of third pins comprise a first set of third pins, a second set of third pins, and a third set of third pins, and the second set of third pins are between the first set of third pins and the third set of third pins, and each of third pins in the first set of third pins and the third set of third pins has a negative polarity, each of third pins in the second set of third pins has a positive polarity, a number of third pins in the first set of third pins is the same as a number of third pins in the third set of third pins, and the second set of third pins comprises at least one third pin.

5. The backlight module of claim 4, wherein each of the first lamp bar units comprises a plurality of first lamp bead sets, and each of the plurality of first lamp bead sets comprises at least one first lamp bead, a sum of the number of the first pins in the first set of first pins and the number of the first pins in the third set of first pins is equal to a quotient obtained by dividing a number of the plurality of first lamp bead sets in the first lamp bar unit coupled to the corresponding first transfer circuit board by a number of the first connectors on the first transfer circuit board, each of the second lamp bar units comprises a plurality of second lamp bead sets, and each of the plurality of second lamp bead sets comprises at least one second lamp bead, and a sum of the number of the third pins in the first set of third pins and the number of the third pins in the third set of third pins is equal to quotient obtained by dividing a number of the plurality of second lamp bead sets in the second lamp bar unit coupled to the corresponding second transfer circuit board by a number of the third connectors on the second transfer circuit board.

6. The backlight module of claim 4, wherein a number of first pins in the second set of the first pins is greater than one half of a sum of the number of the first pins in the first set of the first pins and the number of the first pins in the third set of the first pins, and a number of the third pins in the second set of third pins is greater than one half of a sum of the number of the third pins in the first set of third pins and the number of the third pins in the third set of third pins.

7. The backlight module of claim 4, wherein at least one floating pin is between the first set of first pins and the second set of first pins, and at least one floating pin is between the second set of first pins and the third set of first pins, and at least one floating pin is between the first set of third pins and the second set of third pins, and at least one floating pin is between the second set of third pins and the third set of third pins.

8. The backlight module of claim 3, wherein each of the plurality of first transfer circuit boards comprises two first connectors thereon, and each of the plurality of first transfer circuit boards is coupled to two of the plurality of first connection lines, and each of the plurality of second transfer circuit boards comprises two third connectors thereon, and each of the plurality of second transfer circuit boards is coupled to the two of the plurality of second connection lines.

9. The backlight module of claim 2, wherein the first backlight driving module and the second backlight driving module are rotationally symmetrical at a rotation angle of 180 degree.

10. The backlight module of claim 7, wherein the first backlight driving module comprises a first side and a second side opposite to each other, the first backlight driving module has a plurality of second connectors thereon, the plurality of second connectors are divided into two sets respectively on the first side and the second side, and an orientation of connection surfaces of the second connectors on the first side is opposite to an orientation of connection surfaces of the second connectors on the second side, and the second backlight driving module comprises a third side and a fourth side opposite to each other, the second backlight driving module has a plurality of fourth connectors thereon, the fourth connectors are divided into two sets respectively on the third side and the fourth side, and an orientation of connection surfaces of the fourth connectors on the third side is opposite to an orientation of connection surfaces of the fourth connectors on the fourth side.

11. The backlight module of claim 10, wherein each of the plurality of first connection lines has a socket corresponding to the second connector at one terminal, and a connection surface of the socket of the first connection line is opposite to a connection surface of the second connector, and each of the plurality of second connection lines has a socket corresponding to the fourth connector at one terminal, and a connection surface of the socket of the second connection line is opposite to a connection surface of the fourth connector.

12. The backlight module of claim 3, wherein
each of the plurality of first lamp bar units comprises a plurality of first lamp bars, each of the plurality of first transfer circuit boards further comprises a plurality of fifth connectors on a side of the first transfer circuit board away from the at least one first connector, and each of the plurality of fifth connectors is coupled to one of the plurality of first lamp bars, and
each of the plurality of second lamp bar units comprises a plurality of second lamp bars, each of the plurality of second transfer circuit boards further comprises a plurality of sixth connectors on a side of the second transfer circuit board away from the third connector, and each of the plurality of sixth connectors is coupled to one of the plurality of second lamp bars.

13. The backlight module of claim 12, wherein
the first transfer circuit board further comprises a plurality of third connection lines, the plurality of third connection lines being in one-to-one correspondence with the plurality of fifth connectors, and each of the plurality of third connection lines has one terminal coupled to the corresponding fifth connector and the other terminal coupled to the corresponding first lamp bar, the second transfer circuit board further comprises a plurality of fourth connection lines, the plurality of fourth connection lines being one-to-one correspondence with the plurality of sixth connectors, and each of the plurality of fourth connection lines has one terminal coupled to the corresponding sixth connector and the other terminal coupled to the corresponding second lamp bar, and the plurality of third connection lines are identical to the plurality of fourth connection lines.

14. A display panel comprising at least one backlight module of claim 1.

15. A display device comprising the display panel of claim 14.

16. A display panel comprising at least one backlight module of claim 2.

17. A display panel comprising at least one backlight module of claim 3.

18. A display panel comprising at least one backlight module of claim 4.

19. A display panel comprising at least one backlight module of claim 5.

20. A display panel comprising at least one backlight module of claim 6.

* * * * *